United States Patent [19]

Crocket

[11] 4,389,315
[45] Jun. 21, 1983

[54] FILTER DEVICE WITH PERMEABLE CORRUGATED GRID PANEL

[76] Inventor: Frank Crocket, 36393 Greenspring, Farmington Hills, Mich. 48018

[21] Appl. No.: 286,563

[22] Filed: Jul. 24, 1981

[51] Int. Cl.³ .......................................... B01D 33/22
[52] U.S. Cl. ................................... 210/357; 209/389; 210/387; 210/413
[58] Field of Search ............... 209/261, 273, 385, 389, 209/390; 210/159, 162, 297, 298, 357, 387, 401, 407, 408, 413, 415, 493.1, 526

[56] References Cited

U.S. PATENT DOCUMENTS

| | | | |
|---|---|---|---|
| 1,984,891 | 12/1934 | Miick et al. | 210/162 |
| 2,865,509 | 12/1958 | Harlan | 210/526 |
| 3,083,831 | 4/1963 | Fowler | 210/387 |
| 3,087,620 | 4/1963 | Hirs | 210/387 |
| 3,091,336 | 5/1963 | Hirs | 210/387 |
| 3,322,556 | 7/1967 | Hirs | 210/406 |
| 3,385,448 | 5/1968 | Honan et al. | 210/526 |
| 3,404,779 | 10/1968 | Weathers | 210/387 |
| 4,243,527 | 1/1981 | Leonard | 210/357 |
| 4,250,036 | 2/1981 | Parshall | 210/297 |

FOREIGN PATENT DOCUMENTS 1079 of 1884 United Kingdom ................ 209/389

Primary Examiner—Peter A. Hruskoci
Attorney, Agent, or Firm—Fred P. Kostka; Edward J. Brosius

[57] ABSTRACT

A filter device for separating a foreign material-liquid mixture into distinct portions includes a holding tank. On a bottom of the tank is a permeable grid panel formed with a series of elongated corrugations. The panel connects with an impermeable inclined ramp formed with corrugations of a like configuration. A conveying device carried within the tank comprises a pair of spaced chain loops to which are connected a series of transversely positioned flights. Each flight includes a scraper plate having a corrugated edge which complementally mates with the corrugations of the grid panel and inclined ramp. As the liquid portion of the mixture flows through the grid panel, the foreign material is retained and collects to form a cake on the panel. Periodically the conveyor is activated. The scraper plates move over the grid panel corrugations to remove the collected foreign material and move the foreign material up the inclined ramp for disposition external of the tank.

9 Claims, 9 Drawing Figures

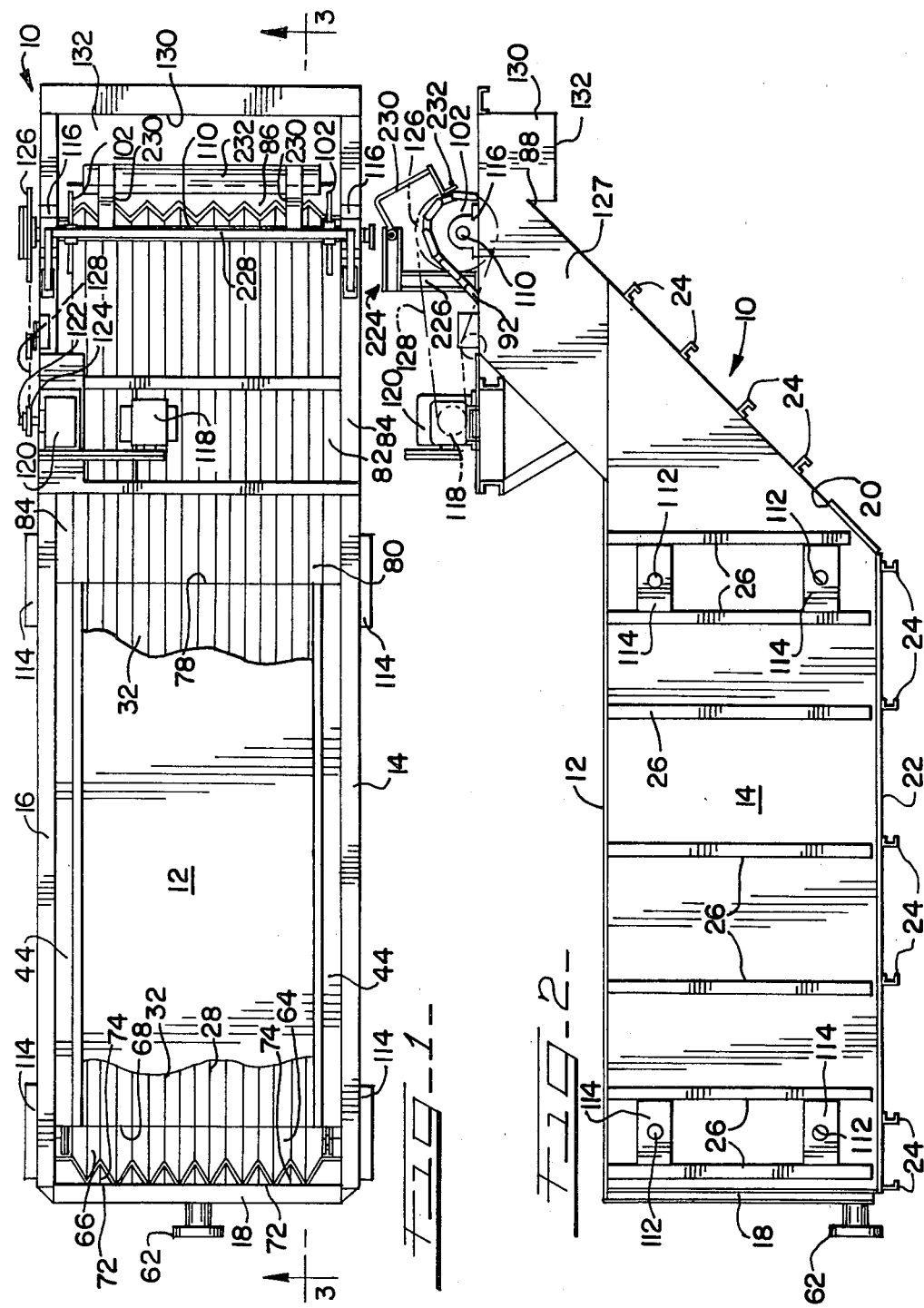

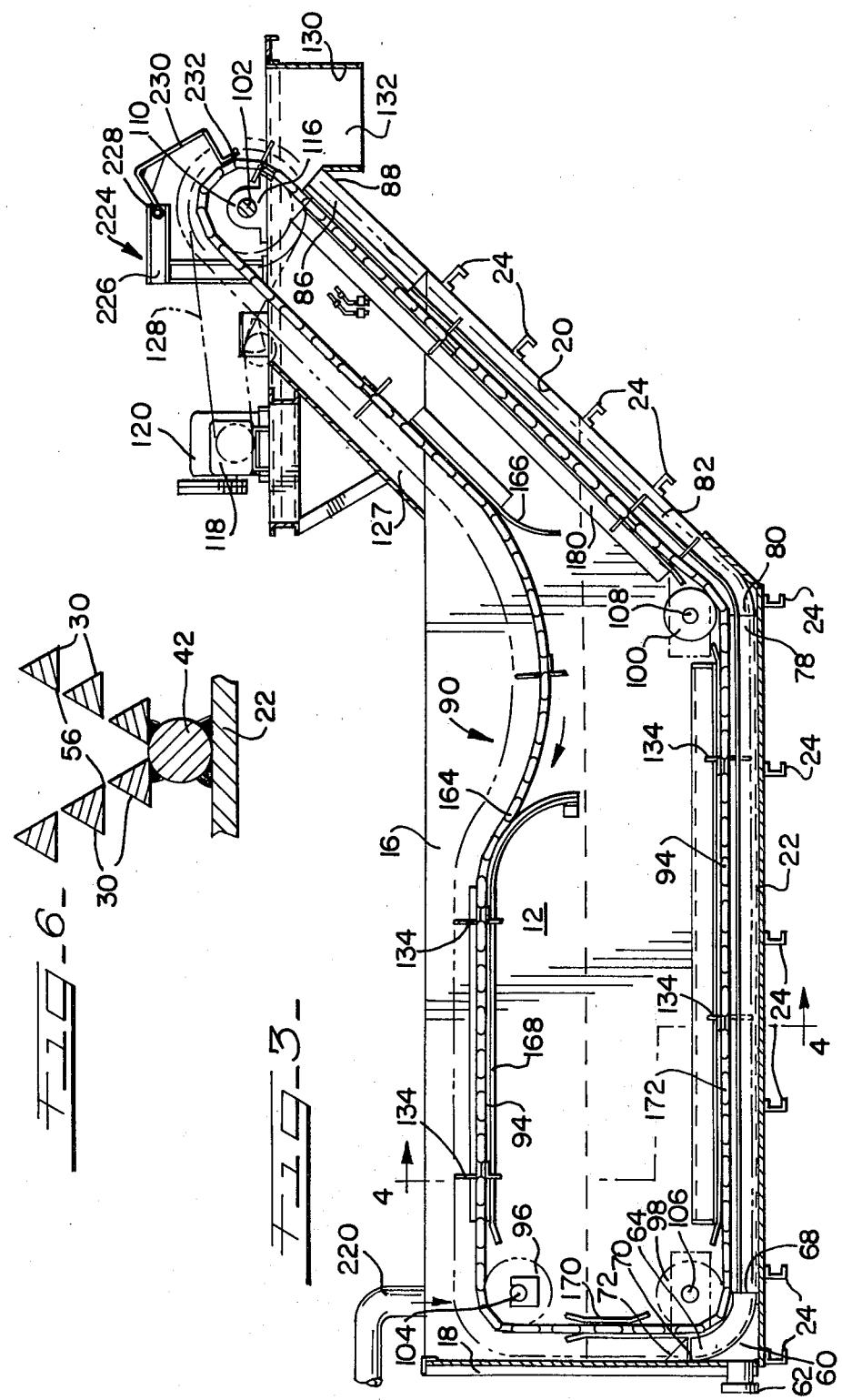

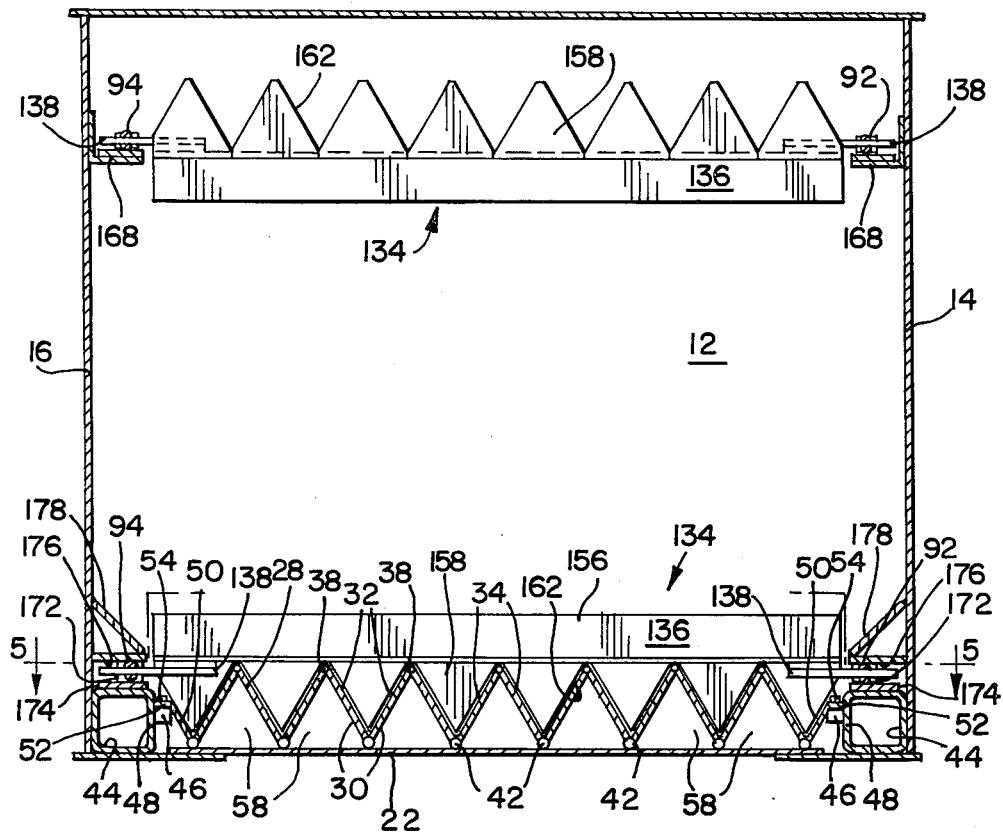
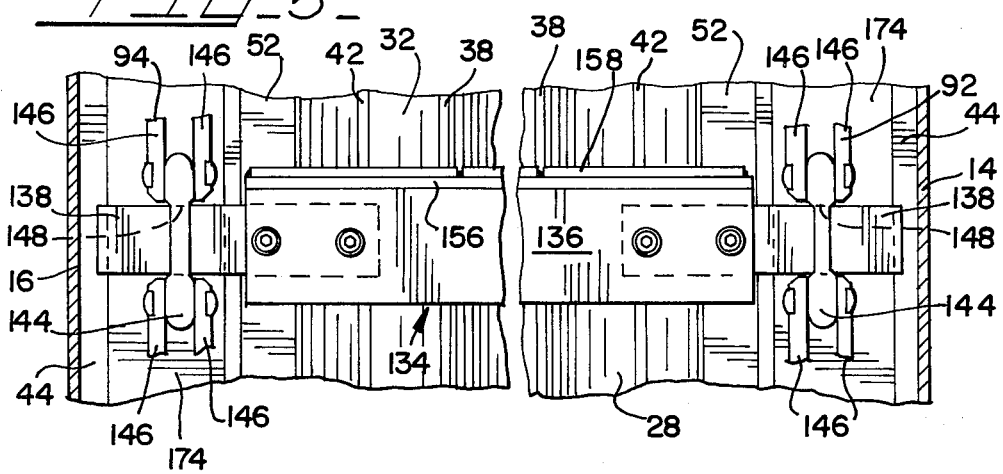

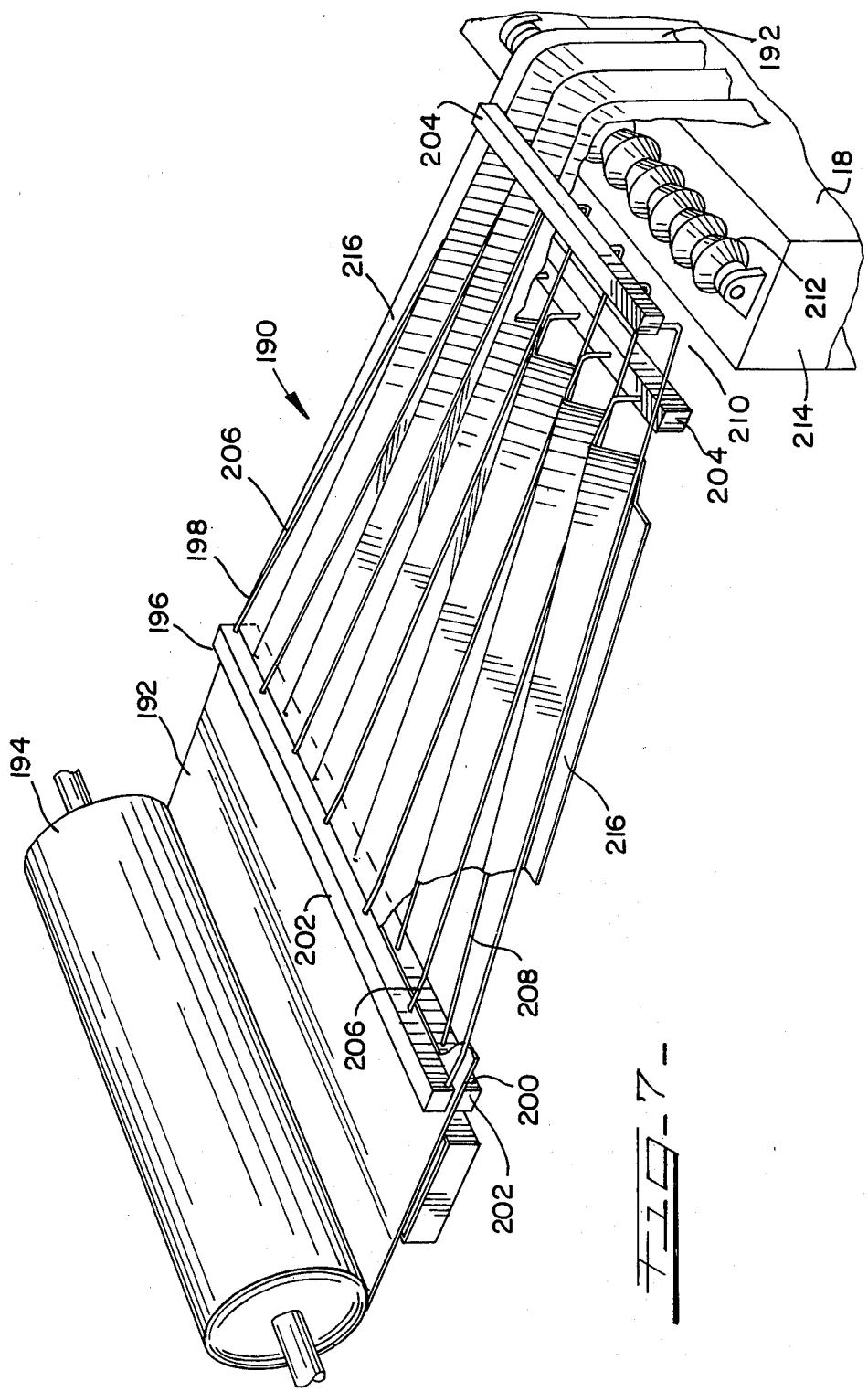

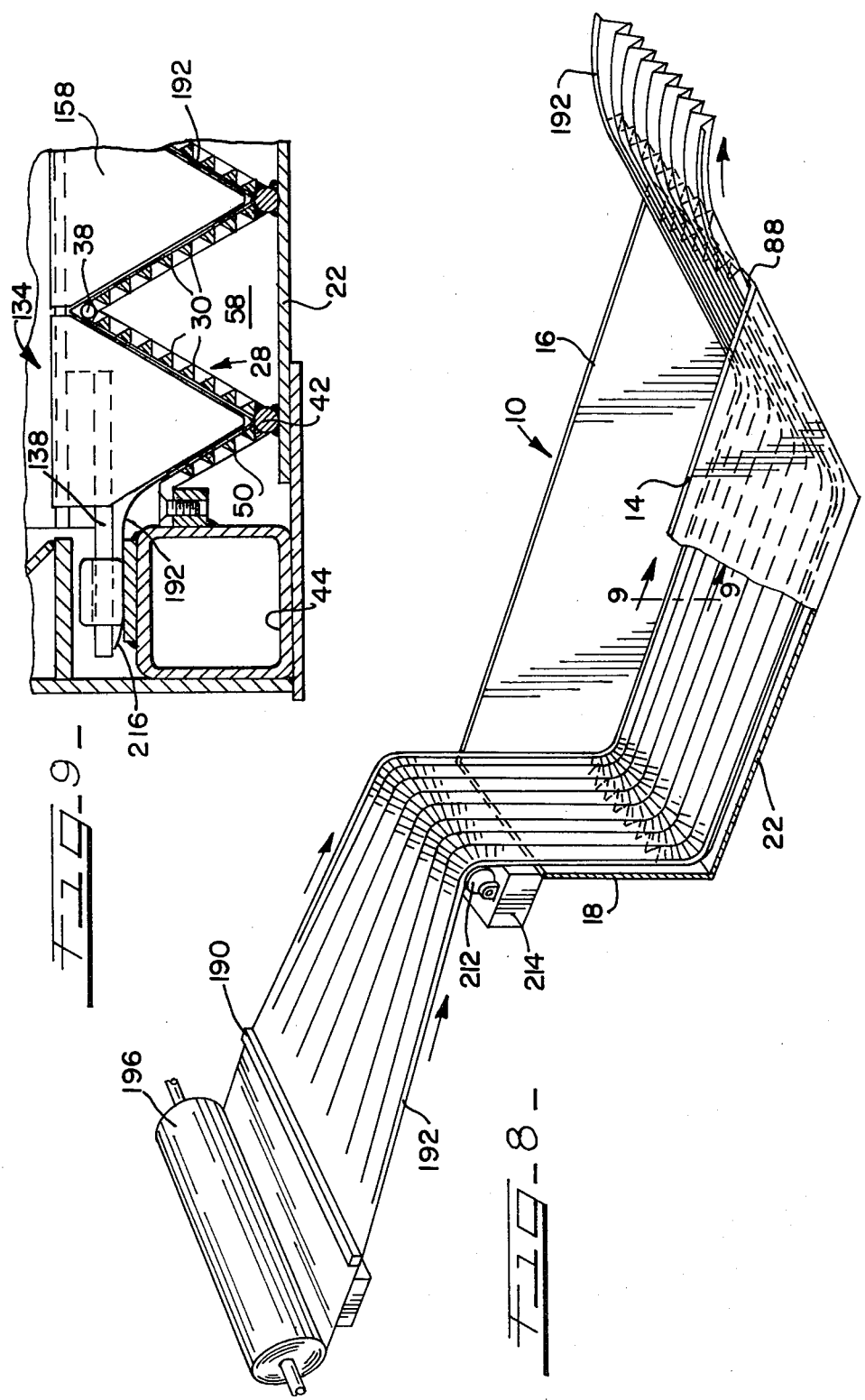

FILTER DEVICE WITH PERMEABLE CORRUGATED GRID PANEL

BACKGROUND OF THE INVENTION

1. Field of the Invention

This invention relates to the art of filtration wherein foreign matter is separated from a liquid flow.

2. Description of the Prior Art

Liquid filtration wherein foreign matter is separated from a liquid is well known. One widely used filter device includes a tank having a pervious bottom which connects with an inclined ramp end wall.

Liquid containing foreign matter is pumped into the tank. As the liquid flows through the bottom, the foreign matter is retained. The tank typically includes a conveyor which comprises a series of transversely positioned flights. Periodically the conveyor is energized so that the flights move across the pervious bottom to remove the foreign material collected thereon. The removed foreign matter is then transported up the ramp by the flights for external disposition.

Where the foreign matter includes particulate having a small particle size or tramp oils, it is common to use a filter media sheet to effect foreign matter retention. The media sheet may be either of a permanent or disposable type and interfaces between the conveyor flights and the pervious bottom and inclined ramp.

Such a liquid filtration device is presently marketed by the assignee herein under the trademark HYDRO-VAC. Early examples of this filter type are set forth in U.S. Pat. Nos. 3,087,620, 3,091,336 and 3,332,556. Also see U.S. Pat. No. 4,250,036 which describes an improved conveyor for use with this type of filter device.

SUMMARY OF THE INVENTION

In accordance with this invention there is provided a filter device for separating foreign material from a liquid flow; the device including a tank to receive the flow; a permeable grid panel having a corrugated surface is carried within the tank to allow passage of the liquid while retaining the foreign material which in turn collects on the corrugated surface; and the device further includes a conveyor operatively carried within the tank with the conveyor having a scraper plate with an edge which complementarily engages the grid panel corrugated surface to remove the foreign material collected thereon.

The invention may be extended to include an inclined ramp carried within the tank and which has a lower end connecting with the grid panel and an upper end interfacing with space external of the tank; the ramp has an impermeable surface to support the foreign material when during use the conveyor scraper plate travels over the ramp surface to move the foreign material up the ramp for disposition in the space external of the tank.

The invention may also be extended to include a sheet of filter media positioned between the corrugated surface of the grid panel and the conveyor plate; during use the filter media sheet retains the foreign material as the liquid flows through the filter media sheet and grid panel with the sheet being movable by the conveyor scraper blade.

The filtration device of this invention has several advantages over known filters.

First, the corrugated grid panel substantially increases the effective area available for liquid flow. Note that while the corrugations are typically vertical, they may also be horizontal. The net result is that the filter may process an increased volume of the foreign material-liquid mixture without being increased in size.

Secondly, the corrugations of the grid panel may be formed to be self-cleaning. Foreign material first retained on upper portions or peaks of the corrugations has a tendency to fall and accumulate in the lower portions or valleys of the corrugations. Thus, the flight conveyor may be operated on a more limited basis. Maintenance costs and energy consumption is thus reduced.

A secondary benefit of self-cleaning is produced by the foreign material collected in the corrugation valleys. The collected foreign material provides further foreign material retention and particularly retention of foreign material having a size sufficiently small to pass through the grid panel. Thus foreign material retention efficiency is improved.

A further advantage is that the configuration of the corrugations can be customized to most efficiently satisfy a particular set of operating parameters. Where the rate of liquid flow is high and the percentage concentration of foreign matter is low, for example, the corrugations can be made in a vertical, square tooth, cross sectional configuration. As noted earlier, this area may be further increased by the corrugations having a horizontal as well as a vertically wavy pattern. Where the foreign matter is of a large particle size, for example metal chips, the corrugations may be made in a triangular configuration to promote self-cleaning.

Lastly, where a filter media sheet is used, the corrugations may be made in a vertical sine wave configuration to provide a smoother contact surface between the conveyor flights, the media and the grid panel. This smoother surface for contact between the flights, the media sheet and the grid panel reduces the possibility of damage to media sheet when the flight conveyor is activated.

DESCRIPTION OF THE DRAWINGS

FIG. 1 is a plan view of the filter device of this invention.

FIG. 2 is a side elevational view of the filter device of FIG. 1.

FIG. 3 is a cross section elevational view as seen generally along the line 3—3 of FIG. 1.

FIG. 4 is a cross section elevational view as seen generally along the line 4—4 of FIG. 3.

FIG. 5 is a fragmentary cross section plan view as seen generally along the line 5—5 of FIG. 4.

FIG. 6 is a detail view in cross section of a lower portion of one grid panel corrugation seen generally in FIG. 4.

FIG. 7 perspective view of a filter media pleating device usable with the filter device of FIG. 1.

FIG. 8 is a schematic view depicting movement of a sheet of filter media through the filter of FIG. 1.

FIG. 9 is a fragmentary cross section elevational view as seen generally along a filter line 9—9 of FIG. 8 and includes other details as shown in FIG. 4.

DESCRIPTION OF THE PREFERRED EMBODIMENT

In FIGS. 1 and 2, a filter device of this invention is shown generally and designated 10. The filter device 10 includes a holding tank 12 defined by sidewalls 14, 16, a vertical end wall 18, an inclined end wall 20 and a flat bottom 22. The inclined end wall 20 extends above the sidewalls 14, 16. The bottom 22 and the inclined end wall 20 are reinforced by a series of spaced, laterally positioned channels 24. In a similar manner, the sidewalls 14, 16 are reinforced by a series of vertical channels 26.

On the bottom 22 is a permeable grid panel 28. The panel 28 may be made from a series of spaced, wedge-shaped wires 30, see FIGS. 6 and 9. Alternatively, other perforated materials may be used. As shown in FIG. 4, the wires 30 are longitudinally positioned and formed in a series of vertical, triangular-shaped corrugations 32. Each corrugation 32 is defined by an angled sidewall 34. Upper ends of adjacent corrugation sidewalls 34 merge at an upper apex and are joined to top round rod 38. Lower ends of adjacent corrugation sidewalls 34 merge at a lower apex and are joined respectively to bottom round rods 42.

Carried longitudinally on the bottom 22 adjacent to each sidewall 14, 16 is a square-shaped support member 44. Projecting inwardly into the tank 12 from each member 44 is a bar 46 which is attached to an inner sidewall 48 of each support member 44. Each outside corrugation 32 of the grid panel 24 has a partial sidewall 50 formed with a horizontal flange 52. The flanges 52 are secured to the support tube bars 46 by bolts 54.

As was noted earlier, the vertical cross-sectional configuration of the corrugations 32 can take a number of forms. For example, the vertical configuration can be square tooth, triangular, semicircular, and even sine wave. Horizontally, the corrugations may be straight as shown in FIG. 1 or shaped in a wavy pattern, for example a sine wave.

Where the corrugations are to be self-cleaning, spacing between adjacent wedge wires 30 can be varied depending on relative location on the wedge wires 30 each within the corrugations 32. For example, spaces 56 between the uppermost wedge wires 30 in each corrugation 32 can be decreased in size and the spaces 56 between the lowermost wedge wires 30, as seen in FIG. 6, increased in size. Since a substantial portion of retained foreign matter accumulates in the corrugation valleys, this collected matter also acts to retain further foreign matter. Use of varying wedge wire spacing equalizes filtration, i.e. foreign matter retention, across the grid panel 28.

As shown in FIGS. 3 and 4, inner spaces 58 defined by the corrugations 32 and the bottom 22 connect with a discharge header 60. The header 60 in turn connects with an outlet fitting 62 carried by the tank vertical end wall 18. The header 60 is defined in part by the end wall 18, the bottom 22 and a corner section 64. The corner section 64 includes an impervious, radiused or arcuate, corrugated plate 66. The corrugations of the corrugated plate 66 have a similar configuration to the grid panel corrugations 32 so that a lower end of the plate 66 abuts a forward end 68 of the grid panel 28 with the corrugations of the plate 66 and the grid panel 28 aligned. An upper end of the corner section 64 is closed by a horizontal plate 70. Attached to the horizontal plate 70 are a series of triangular shaped brackets 72 each having a downwardly inclined guide edge 74. The bracket guide edges 74 align respectively with the top rods 38 of the grid panel 28.

Connecting with an opposite or rear end 78 of the grid panel 28 is a lower radiused or arcuate end 80 of an impervious corrugated ramp section 82 carried on the tank inclined end wall 20, see FIG. 3. The ramp section 82 includes flat side portions 84 which align with the inclined end wall 20 and are affixed to the sidewalls 14, 16. The corrugations of the ramp 82 are similar in configuration to the grid panel corrugations 32 so that there is alignment between the grid panel 28 and the ramp 82. The ramp 82 extends upwardly and terminates at an upper end 86 which is proximately aligned with a top edge 88 of the tank inclined end wall 20.

The filter device 10 further includes a conveyor 90 which is shown in some detail in FIGS. 3, 4 and 5. The conveyor 90 includes a pair of spaced chain loops 92, 94. The chain loops 92, 94 are carried by four chain sprocket pairs 96, 98, 100, 102. Each sprocket pair 96-102 is affixed to a respective shaft 104, 106, 108, 110. The shafts 104, 106 and 108 are idle and thus free to rotate. Each shaft 104, 106 and 108 has its ends 112 extending through the tank sidewalls 14, 16 and secured in brackets 114 attached to an exterior of the tank sidewalls 14, 16.

The sprockets 102, on the other hand, are drive sprockets and keyed to the shaft 110 which in turn is a drive shaft. The drive shaft 110 is rotatively carried by pillow bearing blocks 116 and is operatively connected to an electric motor 118. The electric motor 118 operatively connects with a speed reducer 120 having an output shaft 122. Affixed to the output shaft 122 of the speed reducer 120 is a drive sprocket 124. The drive sprocket 124 in turn connects to a driven sprocket 126 by a drive chain loop 128. The driven sprocket 126 in turn is keyed to the shaft 110.

The motor 118, speed reducer 120 and drive shaft and sprockets 102, 110 are carried on a raised platform 127 which is attached to the tank sidewalls 14, 16. The platform 127 in turn fits over the upper end 86 of the corrugated ramp section 82 and the tank inclined end wall 20. The ramp section upper end 86 and the end wall upper end 88 connect with a discharge chute 130 formed with a rectangular opening 132.

As shown in FIGS. 3, 4 and 5, transversely positioned betweend the chain loops 92, 94 are a series of spaced flight assemblies 134. Each flight assembly 134 includes an angle bracket 136. Attached to each end of the bracket 136 is an extension bar 138. Each chain loop 92, 94 comprises a series of links 144 alternately joined by a series of side plates 146. Every sixth link 144 has an elongated opening 148 in which the flight assembly extension bars 138 are loosely disposed.

Connected to a vertical leg 156 of each flight angle bracket 136 is a scraper plate 158. The scraper plate 158 extends outward from the angle bracket 136 and has a corrugated edge 162 which complementally fits within the corrugations 32 of the grid panel 28, see FIG. 4.

As shown typically in FIG. 3, an upper portion 164 of the chains 92, 94 is supported by chain guides 166, 168. Additionally, the chains 92, 94 are guided in the vertical direction by vertical guides 170 carried by the tank sidewalls 14, 16. The horizontal guides 166, 168 and the vertical guides 170 insure that the chain loops 92, 94 are properly aligned to interact with sprockets 96, 98.

A lower portion 172 of each chain loop 92, 94 rests on a wear plate 174 carried on a top surface of the support members 44, see FIGS. 4 and 5. To insure that each flight scraper plate 154 properly fits into the grid panel corrugations 32, a bottom surface 176 of a triangular-shaped foreign matter deflection bracket 178 is located immediately above each chain loop lower portion 172. Those chain links 144 and side plates 146 of the chain loop lower portions 172 which rest on the flat side portions 84 of the ramp corrugated section 82 are guided from above by inclined guides 180.

In FIG. 7 a filter media sheet pleating device is shown generally and designated 190. The pleating device 190 converts a flat disposable filter media sheet 192 into one having a corrugated or pleated form which may be complementally drawn into the filter 10. The sheet 192 is supplied from a roll 194 and moves into an entrance end 196 of the device 190. Alternatively, the media sheet 152 could be supplied in a prepleated condition.

The device 190 comprises an upper guide portion 198 and a lower guide portion 200. Each portion 198, 200 has a pair of entrance blocks 202 and exit blocks 204. The blocks 202, 204 of each portion 198, 200 are connected by a set of guide wire elements 206, 208 respectively.

The upper guide wire elements 206 are downwardly sloped between the entrance end 196 and an exit end 210. The lower guide wire elements 208 are upwardly sloped so that the sets 206, 208 crisscross in a middle portion of the device 190. As the sheet 192 moves through the device 190, the sheet 192 is transformed to emerge from the device 190 with a pleated configuration.

From the pleating device 190 the filter media sheet 192 moves over a roller 212 rotatively carried by a platform 214 which may be attached to the end wall 18 of the filter tank 12. The roller 212 has a configuration to complementally interact with the sheet 192 and guide the sheet 192 downward to merge with the flight scraper plate 158 and the corner section radiused or arcuate corrugated guide plate 66. Note that the sheet 192 has flat edges 216 to fit under the conveyor chain loops 92, 94, as shown in detail in FIG. 9.

During operation of the filter 10, a flow of liquid containing foreign matter is supplied to the filter tank 12 from an inlet 220 to fill the tank 12 to a level equal to proximately one-half the tank depth. The outlet 62 of the tank 12 may be connected to an intake of a pump (not shown) to increase the pressure differential across the grid panel 28 and thus promote the flow of liquid through the grid panel 28.

During this flow, the foreign matter is retained by the grid panel 28 where it gradually increases in thickness to form a cake. This cake also serves to retain foreign matter so that foreign matter particles of a size which could pass between the spaces 56 between grid panel wedge wires 30 are retained by the cake. Note that where the filter media sheet 192 is used, the foreign matter is retained by the media 192 and the grid panel 28 functions as a permeable support for the sheet 192. Movement of the filter media sheet 192 is shown schematically in FIG. 8. In FIG. 9 the sheet 192 is shown disposed between the grid panel 28 and flight scraper plate 158.

As the thickness of the cake increases, the pressure differential across the grid panel 28 also increases indicating a gradual decrease in the flow rate of the liquid through the grid panel 28. Because of the substantial increase in flow area provided by the corrugations 32 of the grid panel 28, the rate of decrease of liquid flow is slowed proportionally.

When the flow rate becomes inefficiently low, the electric motor 118 is energized to activate the conveyor 90. Note that when there is a high concentration of foreign material, the conveyor 90 may operate continuously. The chain loops 92, 94 move the flight assemblies 134 in the lower loop portion 172 over the grid panel 28. The edges 162 of the scraper plates 158 move over the wedge wire corrugations 32 to remove the foreign matter cake. With each activation of the conveyor 90, a portion of the grid panel 28 is cleaned. The foreign material scraped from the grid panel 28 during previous conveyor activation is pushed up the corrugated ramp section 82 for disposition through the chute 130. Note that when the grid panel 28 is also horizontally corrugated, the flight assemblies 134 move both longitudinally and laterally. In this case the flight assembly bar extensions 138 move in and out of the chain link openings 148 to provide this lateral movement.

To aid in separating the foreign material from the scraper plates 158, a scraper plate cleaning device 224 is located proximate the pair of drive sprockets 102. The device 224 comprises a pair of spaced inverted L-shaped brackets 226 attached at a top of the raised platform 127. Rotatively carried between outer top ends of each bracket 226 is a rod 228. Attached to the rod 228 is a pair of offset shaped straps 230 connected in turn to a horizontal blade 232.

As each flight scraper plate 158 travels about the drive sprockets 102, the cleaning device blade 232 moves over the scraper plate 158 to produce a scraping action to effect removal of a foreign material which has adhered to the plate 158.

While various modifications may be suggested by those versed in the art, it should be understood that I wish to embody within the scope of the patent warranted hereon all such modifications as reasonably and properly come within the scope of my contribution to the art.

What is claimed is:

1. A filter device for separating foreign material from a liquid flow, said device comprising,
    a tank for receiving said flow of said liquid and foreign material through an inlet means, and outlet means for discharging said foreign material and the filtered liquid,
    a grid panel having permeable corrugated surface carried within said tank to allow passage of said liquid while retaining said foreign material to collect on said corrugated surface, said permeable corrugated surface including a series of permeable filter surfaces interconnected at respective tops and bottoms to form acute angles between said permeable filter surfaces at each such connection, and
    a conveyor operatively connected to said tank, said conveyor having a scraper plate with an edge to complementally engage said grid panel corrugated surface and remove said foreign material collected thereon.

2. A filter device as defined by claim 1 and further characterized by,
    an inclined ramp carried within said tank, said ramp having a lower end connecting with said grid panel and an upper end interfacing with space external of said track, said ramp having an impermeable surface to provide support for said foreign material as scraper plate travels over said ramp surface to move said foreign material up said ramp for disposition in said space external of said tank.

3. A filter device as defined by claim 1 and further characterized by,
    a sheet of filter media positioned between said grid panel corrugated surface and said conveyor scraper plate with said foreign material being retained by said media as said liquid flows through said media and said grid panel with said sheet being movable by said conveyor scraper plate.

4. A filter device for separating foreign material from a liquid flow, an improvement in said device comprising,
   a tank having a permeable bottom area formed with a series of longitudinal corrugations, said corrugations including a series of filter surfaces interconnected at respective tops and bottoms to form acute angles between said permeable filter surfaces at each such connection, an end of said bottom area joining an impermeable inclined ramp section having like corrugations extending from said bottom area to an upper portion of said tank, said tank having inlet means to receive said liquid flow and outlet means to discharge said foreign material and filtered liquid, and
   conveying means carried by said tank for removing said foreign material collecting on said bottom area and transporting said material up said inclined ramp, said means including flights positioned transverse to said bottom area and ramp corrugations with said flights having a scraper plate formed to complementally fit within said corrugations,
   wherein said foreign material is retained on said permeable bottom area as said liquid flows from said device in a cleaned condition.

5. A filter device as defined by claim 4 and further characterized by including,
   disposable filter media means comprising a media sheet suppliable from a roll external of said tank, said media sheet interfacing between said conveying means scraper plates and said bottom and ramp corrugations for retaining said foreign material, said media means and retained foreign material movable up said ramp upon selective activation of said conveying means.

6. A filter device as defined by claim 5 and further characterized by including,
   disposable filter media sheet pleating means, said means located between said roll and said tank and comprising an upper and a lower guide wire set having ends carried in spaced upper and lower blocks at an entrance and exit end of said device, said wire sets spaced at said entrance end to allow said sheet to enter said device in a flat condition with said set merging and becoming offset at said exit end to transform said flat condition of said sheet to a pleated condition,
   wherein said sheet in said pleated condition merges with said conveyor flight at a point proximate a merger of said flights with said bottom area.

7. A filter device particularly adapted for receiving a flow of a foreign material-liquid mixture, through an inlet means separating said foreign material from said liquid to allow said liquid to be discharged from said device in a foreign material-free condition, through an outlet means said device comprising,
   a tank defined by spaced sidewalls joined at one end by a vertical end wall and at an opposite end by an inclined end wall and a bottom,
   a pair of support members carried by said bottom and positioned one each adjacent to said sidewalls,
   a liquid pervious grid panel formed with a series of longitudinally positioned, vertical corrugations, said panel having outside edge corrugated portions connecting with said support members,
   a corner section having impervious arcuate corrugated plate with a lower end of said plate aligning and mating with a forward end of said grid panel corrugations, said corner section joining with said bottom and said end wall to define in part a discharge header connecting with clean liquid inner space formed between said grid panel and said tank bottom for movement of said liquid having passed through said grid panel,
   a ramp section having impervious corrugations and carried on said tank inclined end wall, said section having lower arcuate end aligning and mating with a rear end of said grid panel corrugation, and an upper end of said section connecting with a foreign material discharge chute carried by said tank exterior of said tank inclined end wall, and
   a conveyor assembly comprising two spaced chain loops rotatively carried by pairs of chain sprockets respectively keyed to shafts carried by said tank sidewalls with a lower portion of each said chain loop respectively carried in part by said support members, and a series of flight assemblies transversely positioned between said chain loops and intermittently spaced thereabout, said assemblies having ends operatively connected to said chains and a scraper plate formed with an extending corrugated edge to complementally interact with said corrugation of said corner section, said grid panel and said ramp section,
   wherein said foreign material-liquid mixture may be introduced into said tank from a convenient inlet, said liquid flowing through said grid panel into said clean liquid inner spaces and to said discharge header, said foreign materials being retained by said grid panel to collect and form a cake thereon, and said flight conveyor scraper plates moving over said grid panel corrugations to remove said collected foreign material and move said foreign material up said inclined ramp section for disposition through said discharge chute.

8. A filter device as defined by claim 7 and further characterized by including flight scraper plate cleaning means comprising,
   a pair of spaced inverted L-shaped brackets attached to a platform carried by said tank,
   a rod carried between said bracket and positioned transversely to said tank, and
   a scraper blade attached to a pair of spaced straps pivotally attached to said rod, said blade aligned with said flight conveyor scraper plates moving about said drive sprockets and positioned to contact said scraper plate and move over said plate to produce a cleaning action.

9. A filter device as defined by claim 7 and further characterized by said corrugations having a wavy horizontal configuration.

* * * * *